United States Patent [19]

Muller et al.

[11] 4,010,659
[45] Mar. 8, 1977

[54] STEERING WHEEL HAVING HELICAL RIM CORE

[75] Inventors: George H. Muller, Ann Arbor; Warren A. VanWicklin, Jr., Dearborn, both of Mich.

[73] Assignee: Ford Motor Company, Dearborn, Mich.

[22] Filed: Dec. 19, 1975

[21] Appl. No.: 642,411

[52] U.S. Cl. ................................................. 74/552
[51] Int. Cl.² ...................... B62D 1/04; G05G 1/10
[58] Field of Search ..................... 74/552, 492, 493

[56] References Cited

UNITED STATES PATENTS

| 2,596,784 | 5/1952 | Nagin | 74/552 |
|---|---|---|---|
| 2,810,301 | 10/1957 | Mathues | 74/552 |
| 2,814,211 | 11/1957 | Hoagg | 74/552 |
| 2,889,714 | 6/1959 | Romano | 74/493 |
| 3,321,996 | 5/1967 | Cardinale | 74/552 |
| 3,456,526 | 7/1969 | Brilmyer | 74/552 |
| 3,613,476 | 10/1971 | Cunningham | 74/492 |

*Primary Examiner*—Leonard H. Gerin
*Attorney, Agent, or Firm*—Clifford L. Sadler; Keith L. Zerschling

[57] ABSTRACT

A steering wheel for a motor vehicle made according to the present disclosure has a resiliently flexible rim core that is formed by a flat spring wire wound in a helical manner to provide a multiple leaf construction. A steering wheel rim having this core structure is resiliently deflectable in response to an impact load imposed upon the rim in a direction parallel to the axis of the wheel and resistant to deflection by a generally tangential force exerted by a vehicle operator while turning the wheel.

7 Claims, 10 Drawing Figures

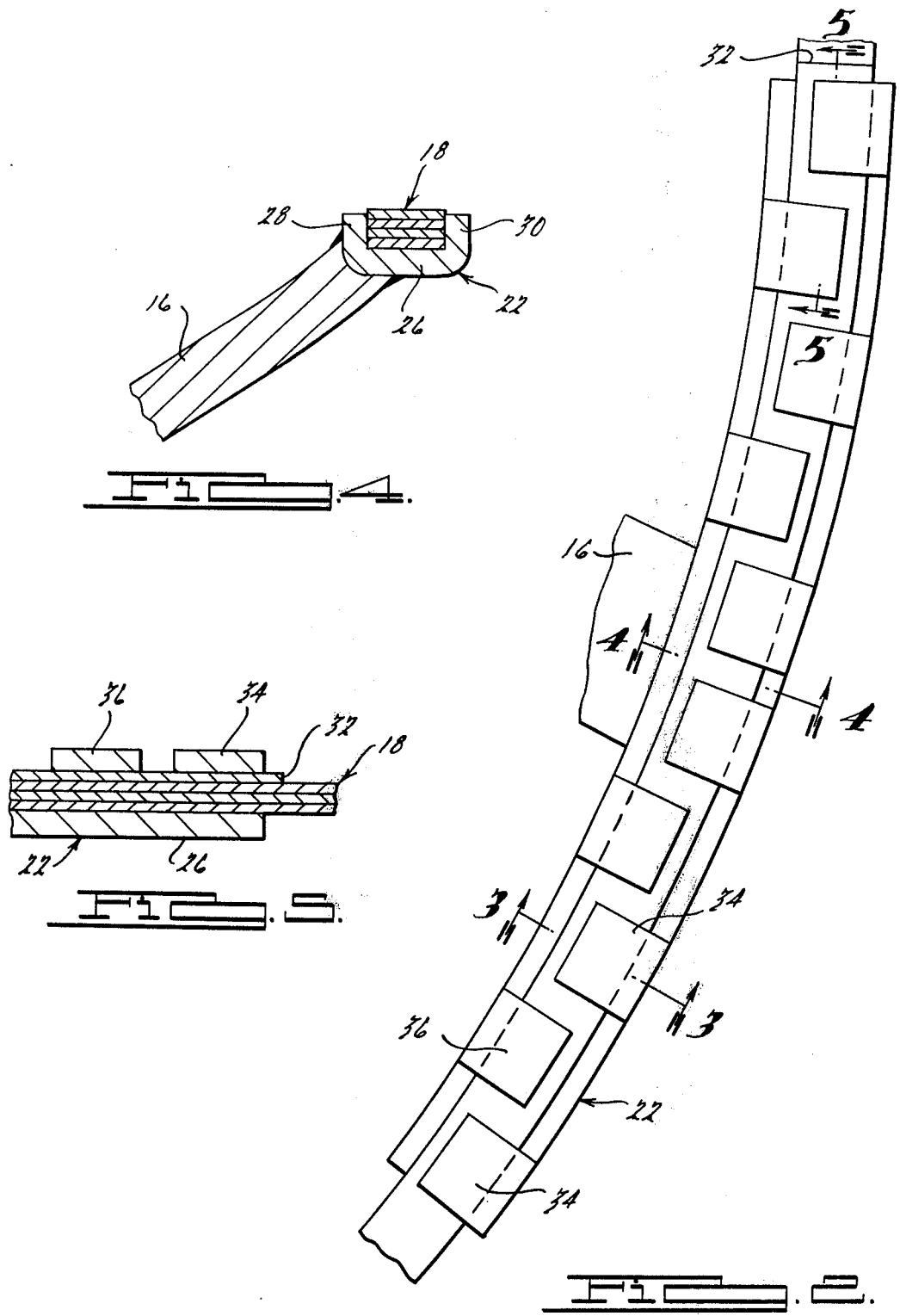

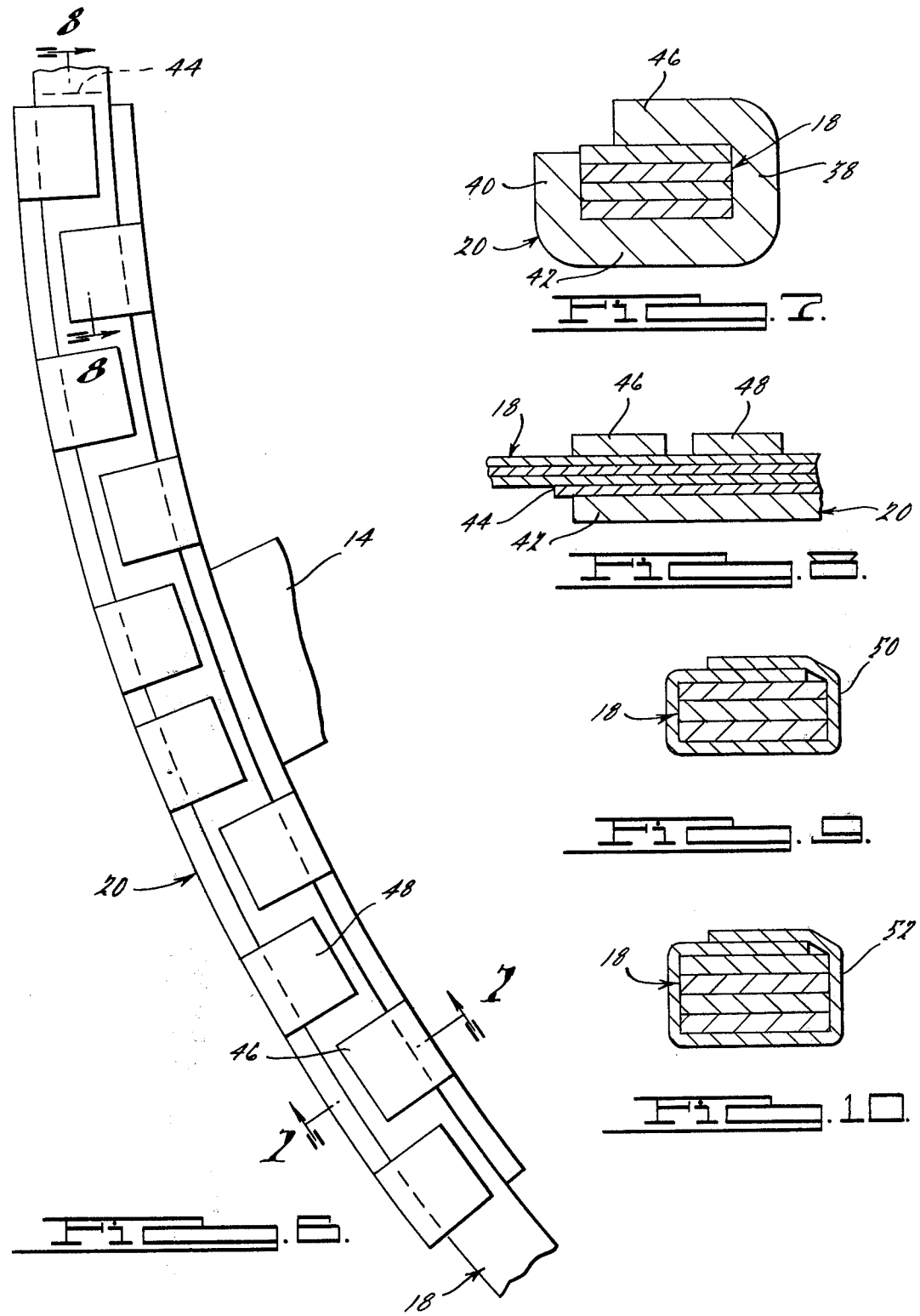

STEERING WHEEL HAVING HELICAL RIM CORE

BACKGROUND OF THE DISLCOSURE

The present disclosure relates generally to steering wheels for motor vehicles, and more particularly to a steering wheel construction in which the wheel has a rim core that is resiliently deflectable to absorb impact loads. A steering wheel according to the present disclosure provides an improvement over prior art steering wheels such as shown in U.S. Pat. Nos. 3,321,996, 3,456,526 and 3,613,476.

BRIEF SUMMARY OF THE DISCLOSURE

A steering wheel made in according with the present disclosure includes a hub from which a pair of spokes radiate. A pair of generally channel shape attachment members are welded to the outer ends of the spokes. An annular rim core assembly is positioned, in part, in the attachment members. The rim core comprises a one-piece, helically wound, flat wire that is rigidly secured to the attachment members. The rim core is covered by a plastic casing which provides a gripping surface for a motor vehicle operator.

The helical core member functions as a multi-leaf spring that resiliently absorbs an impact load imposed upon the rim in a direction parallel to the axis of rotation of the steering wheel. The rim is rigid with respect to a generally tangential force exerted by a vehicle operator while turning the wheel.

In the illustrated embodiment, the rim core is formed by a helix having three and one-half turns and is arranged with respect to the spokes of the wheel so that four layers of leaf spring material are provided in the lower half of the wheel rim and three layers are provided in the upper half of the wheel rim. With this construction the upper half of the steering wheel has greater resiliency than the lower half with respect to an impact load.

BRIEF SUMMARY OF THE DRAWINGS

The many objects and advantges of a steering wheel constructed in accordance with this invention will become apparent upon consideration of the following detailed discussion when considered in association with the accompanying drawings, in which:

FIG. 2 is an enlarged view of the attachment of the rim core to the right steering wheel spoke;

FIG. 4 is a sectional view taken along section line 4—4 of FIG. 2;

FIG. 5 is a sectional view taken along section line 5—5 of FIG. 2;

FIG. 6 is an enlarged view of the attachment between the end of the left steering wheel spoke and the rim core;

FIG. 7 is a sectional view taken along section line 7—7 of FIG. 6;

FIG. 8 is a sectional view taken along section line 8—8 of FIG. 6;

FIG. 9 is a sectional view of the rim core taken along section line 9—9 of FIG. 1; and FIG. 10 is a sectional view of the rim core taken along section line 10—10 of FIG. 1.

DETAILED DESCRIPTION OF PRESENTLY PREFERRED EMBODIMENT

Figure 1:
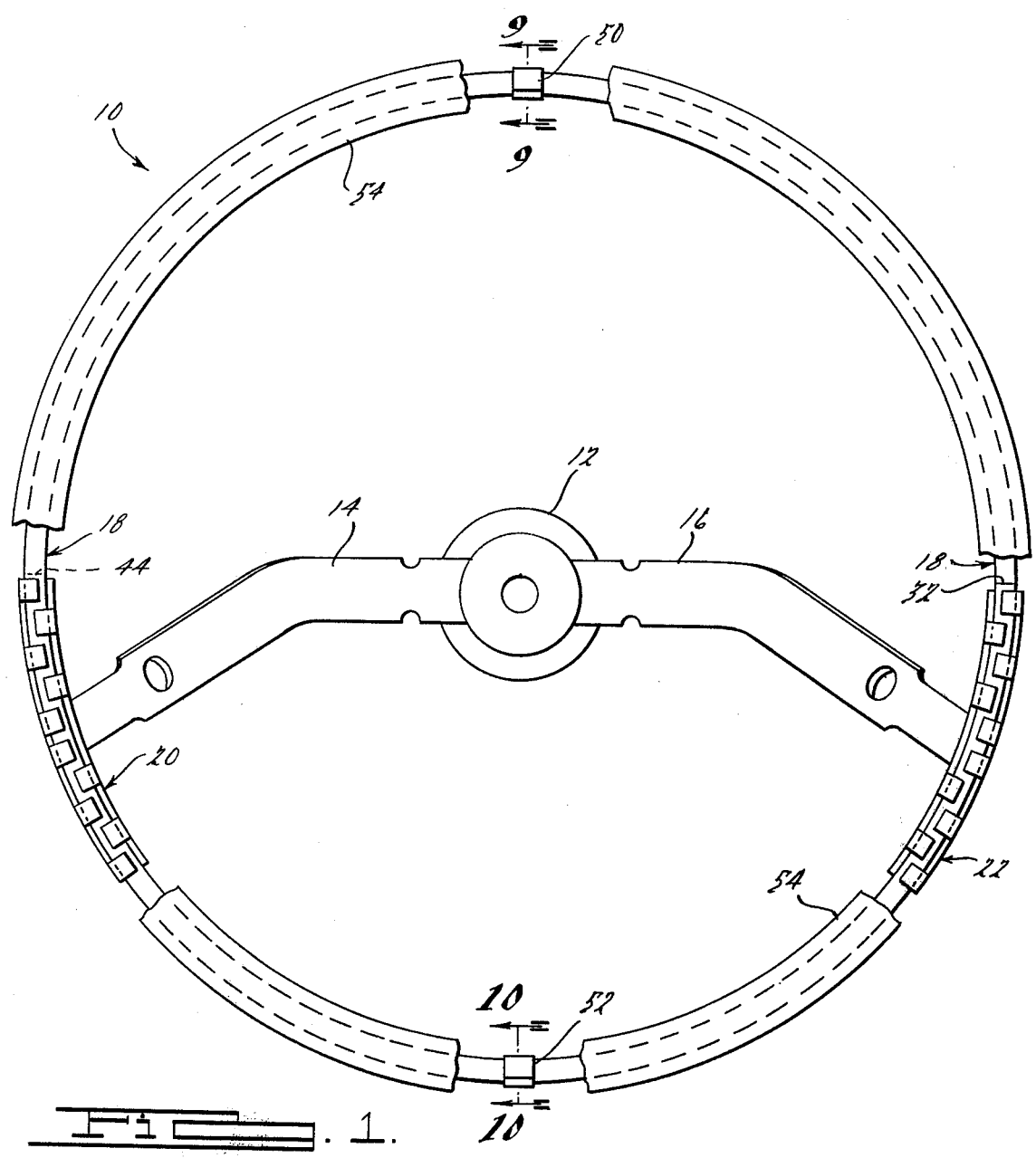
FIG. 1 is a plan view of a steering wheel according to a preferred embodiment of the invention with a portion of the plastic covering removed to disclose the construction of the rim core, spokes and hub.

Referring now to the drawings wherein the presently preferred embodiment of this invention is illustrated, FIG. 1 discloses a steering wheel 10 for a motor vehicle. The wheel 10 includes a machined metal hub 12, constructed to be attached to a steering shaft, to which left and right spokes 14 and 16 are secured by welding. A rim core 18 is secured to the spokes 14 and 16 by means of left and right attachment brackets 20 and 22 welded to the outer ends of the spokes 14 and 16.

The rim core 18 comprises a flat spring metal wire wound by continuous edge rolling into a helix of three and a half turns to form an annular axially resilient rim core. The helical rim core 18 is wound with three and a half turns or coils to provide a one-piece construction having a multiple leaf function. A cross section through the flat spring wire forming the core 18 is rectangular in shape with the long sides of the rectangle lying in planes perpendicular to the axis of rotation of the wheel 10.

Figure 3:
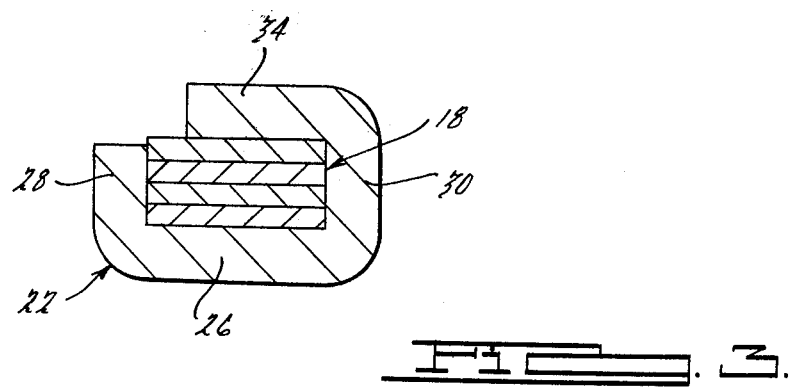
FIG. 3 is a sectional view taken along section line 3—3 of FIG. 2.

Referring to FIG. 2, the right attachment bracket 22 has an arcuate shape in the plan view and a channel shape in cross section. The attachment bracket 22 is formed by a bottom wall 26 and inner and outer arcuate side walls 28 and 30 as seen in FIGS. 3 and 4. The outer end of the spoke 16 is welded to the bottom wall 26 and the side wall 28. A segment of the helical rim core 18 is positioned in the attachment member 22 between the side walls 28 and 30. The end 32 of the flat wire forming the helical core 28 is situated just above the upper end of the attachment bracket 22. The outer side wall 30 is provided with a series of spaced apart locking tabs 34 along its upper edge. In a similar manner, locking tabs 36 are provided along the upper edge of the inner side wall 28. The tabs 34 and 36 are arranged in an alternate manner so that when they are crimped over into locking engagement with the helical rim core 18, the core 18 is rigidly secured to the attachment member 22.

The left attachment member 20 is similar in construction to the right bracket 22 and has arcuate spaced apart inner and outer side walls 38 and 40 and a bottom wall 42. The bracket 20 is welded to the outer end of the spoke 14 in a manner similar to the attachment of the bracket 22 to the spoke 16 as shown in FIG. 4.

A segment of the helical rim core 18 is positioned between the side walls 38 and 40. The end 44 of wire forming the helix 18 is situated just above the upper terminus of the attachment member 20. The upper edge of the inner side wall 38 is provided with a series of spaced apart locking tabs 46. The upper edge of the outer side wall 40 is provided with locking tabs 48 which are in alignment with the spaces between the tabs 46. The tabs 46 and 48 are crimped over in interdigital fashion into locking engagement with the helical core 18.

Referring to FIG. 9, a midpoint in the upper half of the helical rim core 18 is surrounded by a metal strap 50. A midpoint in the lower half of the helical rim core 18 is bounded by a metal strap 52. The straps 50 and 52 serve to hold the coils of the hexical rim core 18 together during assembly of the steering wheel 10.

The hub 12 and the spokes 14 and 16 are enclosed in a plastic housing (not shown). The rim core 18 is enclosed by a plastic part 54 which is molded about it. The plastic 54 provides a gripping surface for the vehicle operator.

A preferred method for manufacturing the steering wheel 10 includes the steps of machining the hub 12 and attaching the spokes 14 and 16 thereto such as by welding. The attachment members 20 and 22 are welded to the outer ends of the spokes 14 and 16. At this point in the manufacturing operation, the tabs 46 and 48 of member 20 and the tabs 34 and 36 of the member 22 are arranged parallel to their adjacent side walls.

The rim core 18 is fabricated by continuous edge rolling a flat spring wire to form an annular helix of three and a half turns, the diameter of the helix corresponding to the diameter of the rim core. The helix is then heat treated.

The core 18 may also be formed by continuous edge rolling flat spring wire to form a helix of many turns or coils such as one or two hundred coils. The large helix thus formed is then heat treated. The next step is to cut the spring wire coil into individual helixes of three and one-half turns each (or whatever number has been selected for use in the rim core 18).

The coils or layers of leaf spring material forming the helix 18 are held in tight engagement by wrapping the band 50 about one midpoint halfway between the ends 42 and 44 of the coil 18 and a second band 52 about the coils at a point diametrically opposite the band 50. Segments of the helical rim core 18 are then positioned between the side walls 38 and 40 of attachment member 20 and between the side walls 28 and 30 of attachment member 22. The next step in the manufacturing operation is to crimp the tabs 46 and 48 of attachment member 20 and the tabs 34 and 36 of attachment member 22 into locking engagement with the helical rim core 18. The final steps in the manufacture of the steering wheel 10 includes enclosing the hub 12 and spokes 14 and 16 in a plastic housing and molding the plastic covering 54 about the rim core 18.

OPERATION

An impact load parallel to the axis of the steering wheel 10 upon the rim of the wheel 10 will cause the core 18 to resiliently deflect whereby a portion of the impact load will be absorbed. It will be noted that the steering wheel 10 has three layers of leaf spring material in its upper half as seen in FIG. 9 where the band 50 encircles three layers of the helical rim core 18. The lower half of the helical rim core 18 between the ends 32 and 44 has four layers of leaf spring material. Referring to FIG. 10, it will be noted that the strap 52 encircling the helical rim core 18 surrounds four such layers. Therefore, an impact load upon the upper half of the steering wheel rim (which has three leaf spring layers) will encounter greater resiliency than an impact load against the lower half (which has four leaf spring layers). Thus, this construction provides a steering wheel rim having different spring rates or different resiliencies in different portions of the rim in order to accommodate prevailing or anticipated forces.

It will also be noted that the spokes 14 and 16 are angled downwardly in dogleg fashion so that the length of the unsupported rim core 18 between the lower ends of the attachment members 20 and 22 is substantially less than the unsupported distance between the upper ends of the attachment members 20 and 22. Due to this configuration and location of the attachment members 20 and 22, the upper half of the rim of the wheel 10 will have greater resiliency than the lower half where the unsupported length of the rim core 18 is substantially less.

If it is desired to have substantially the same resiliency for both the top and the bottom halves of the rim of the wheel 10 while maintaining the configuration of the spokes 14 and 16 as shown in FIG. 1, then the rim core 18 may be reversed with four layers of leaf spring material in the upper half and three layers in the lower half. With this type of arrangement the rim core 18 will be stiffer in the upper half to compensate for the fact that it spans a greater distance between the attachment members 20 and 22 than is spanned by the lower half which will have the more resilient three layer construction. With this alternate construction, it may be necessary to provide mechanical means for containing the ends 32 and 44 of the rim core 18 such as by the use of straps similar to straps 50 and 52 surrounding the core 18 adjacent to the ends 32 and 44 or by extending the ends into the attachment members 20 and 22 whereby they will be contained by the crimping pressure of the locking tabs.

Each layer of the helical rim core has a rectangular cross section with the long sides of the rectangle being parallel to a plane perpendicular to the axis of rotation of the steering wheel 10. This provides a rim construction that is rigid with respect to a generally tangential force exerted by a motor vehicle operator in turning the wheel.

A steering wheel for a motor vehicle made in accordance with this invention is characterized by its simplicity of construction and economy in manufacture. It is further characterized by its superior performance in a motor vehicle.

The foregoing description presents the presently preferred embodiment of this invention. Details of construction have been disclosed for purposes of illustration and are not to be considered limits of the invention. Modifications and alterations of the invention may occur to those skilled in the art that will come within the scope and spirit of the following claims.

We claim:

1. A steering wheel for a motor vehicle having a hub, a rim core and a spoke interconnecting said hub and rim core;

said rim core comprising a one-piece spring metal helix;

a center of said helix lying on the axis of rotation of said steering wheel;

said rim core being resiliently deformable in response to an impact load imposed upon said core in a direction parallel to the axis of said steering wheel;

said rim core being constructed to be substantially rigid with respect to a tangential force applied by a vehicle operator to said rim core for the purpose of turning said vehicle.

2. A steering wheel for a motor vehicle according to claim 1 and including:

said helix comprising a flat band.

3. A steering wheel for a motor vehicle according to claim 1 and including:

said helix having a plurality of full coils and one partial coil.

4. A steering wheel for a motor vehicle according to claim 1 and including:

said helix comprising a flat band having a plurality of full coils and one partial coil.

5. A steering wheel for a motor vehicle having a hub, a rim assembly and a spoke interconnecting said hub and said rim assembly;
- an attachment member secured to the outer end of the spoke;
- said rim assembly comprising a helical metal band;
- said metal band having a cross sectional configuration that includes two long parallel sides arranged perpendicular to the axis of rotation of said steering wheel;
- said attachment member being rigidly secured to said rim assembly;
- said rim assembly being resiliently deformable in response to an impact load imposed upon said assembly in a direction parallel to the axis of said steering wheel;
- said rim assembly being constructed to be substantially rigid with respect to a tangential force applied by a vehicle operator to said assembly for the purpose of turning said wheel.

6. A steering wheel for a motor vehicle according to claim 5 and including:
- said helical metal band having a plurality of full coils and one partial coil.

7. A steering wheel for a motor vehicle having a hub, a rim assembly and a pair of spokes interconnecting said hub and said rim assembly:
- an attachment member secured to the outer end of each of said spokes;
- said rim assembly comprising a helical metal band having a plurality of full coils and one partial coil;
- said metal band having a cross sectional configuration that includes two long parallel sides arranged perpendicular to the axis of rotation of said steering wheel;
- said attachment members being rigidly secured to said rim assembly;
- one end of said helical band being disposed adjacent one of said attachment members and the other end of said helical band being disposed adjacent the other of said attachment members;
- said rim assembly being resiliently deformable in response to an impact load imposed upon said assembly in a direction parallel to the axis of said steering wheel, said resiliency being greater in the area of said rim assembly having said plurality of full coils than in the area of said rim assembly having said plurality of full coils and said one partial coil;
- said rim assembly being constructed to be substantially rigid with respect to a tangential force applied by a vehicle operator to said assembly for the purpose of turning said wheel.

* * * * *